(12) United States Patent
Muller

(10) Patent No.: US 10,101,062 B2
(45) Date of Patent: Oct. 16, 2018

(54) ONE-PIECE PART INCLUDING A MAGNETOCALORIC MATERIAL NOT INCLUDING AN ALLOY INCLUDING IRON AND SILICON AND A LANTHANIDE, AND HEAT GENERATOR INCLUDING SAID PART

(71) Applicant: COOLTECH APPLICATIONS, Holtzheim (FR)

(72) Inventor: Christian Muller, Strasbourg (FR)

(73) Assignee: COOLTECH APPLICATIONS, Holtzheim (FR)

( * ) Notice: Subject to any disclaimer, the term of this patent is extended or adjusted under 35 U.S.C. 154(b) by 432 days.

(21) Appl. No.: 14/418,384

(22) PCT Filed: Jul. 25, 2013

(86) PCT No.: PCT/EP2013/065749
§ 371 (c)(1),
(2) Date: Jan. 29, 2015

(87) PCT Pub. No.: WO2014/019941
PCT Pub. Date: Feb. 6, 2014

(65) Prior Publication Data
US 2015/0184900 A1 Jul. 2, 2015

(30) Foreign Application Priority Data
Aug. 1, 2012 (FR) ..................... 12 57496

(51) Int. Cl.
*F25B 21/00* (2006.01)
*F28F 3/04* (2006.01)
(52) U.S. Cl.
CPC ........ *F25B 21/00* (2013.01); *F25B 2321/002* (2013.01); *F25B 2500/01* (2013.01);
(Continued)

(58) Field of Classification Search
CPC ................ F25B 21/00; F25B 2321/002; F25B 2500/01; F25B 2500/09; F28F 3/048;
(Continued)

(56) References Cited
U.S. PATENT DOCUMENTS

2004/0182542 A1* 9/2004 Take ................... H01L 23/3672
165/80.3
2008/0264611 A1* 10/2008 Chang ................. H01L 21/4882
165/104.26
(Continued)

FOREIGN PATENT DOCUMENTS

CN 1369675 A 9/2002
EP 0552538 A1 7/1993
(Continued)

OTHER PUBLICATIONS

Translation of JPH 1055907.*
(Continued)

*Primary Examiner* — Elizabeth Martin
(74) *Attorney, Agent, or Firm* — Baker & Hostetler LLP

(57) ABSTRACT

A one-piece part based on a magnetocaloric material not comprising an alloy comprising iron and silicon and a lanthanide is provided. The part comprises a base in a first plane defined by a first and second direction and a set of N unitary blades secured to the base; the blades having a first dimension in the first direction, a second dimension in the second direction and a third dimension in a third direction at right angles to the first and second dimensions; an ith blade being separated from an (i+1)th blade by an ith distance; the ratio between the second dimension and first dimension being at least 10; the ratio between the third dimension and first dimension being at least 6; the first dimension being the
(Continued)

same order of magnitude as the distance separating an ith blade from an (i+1)th blade. A thermal generator comprising one-piece parts is provided.

30 Claims, 16 Drawing Sheets

(52) U.S. Cl.
CPC ........... *F25B 2500/09* (2013.01); *F28F 3/048* (2013.01); *Y02B 30/66* (2013.01)

(58) Field of Classification Search
CPC ....... F28F 2515/04; F28F 13/14; Y02B 30/66; B29C 47/003; B29C 47/0066
See application file for complete search history.

(56) References Cited

U.S. PATENT DOCUMENTS

| | | | | |
|---|---|---|---|---|
| 2009/0145581 A1* | 6/2009 | Hoffman | ................... | F28F 1/40 |
| | | | | 165/80.3 |
| 2010/0116471 A1* | 5/2010 | Reppel | .................... | F25B 21/00 |
| | | | | 165/133 |
| 2011/0079370 A1* | 4/2011 | Wen | ........................ | F28F 13/00 |
| | | | | 165/80.3 |
| 2013/0199754 A1* | 8/2013 | Kuo | ........................ | F25B 21/00 |
| | | | | 165/104.11 |
| 2013/0232993 A1 | 9/2013 | Saito et al. | | |

FOREIGN PATENT DOCUMENTS

| | | |
|---|---|---|
| JP | S61-235655 A | 10/1986 |
| JP | 2-108392 U | 8/1990 |
| JP | 10-055907 A | 2/1998 |
| JP | 2011-523676 A | 8/2011 |
| JP | 2012-503754 A | 2/2012 |
| WO | 2008099234 A1 | 8/2008 |
| WO | 2009024412 A1 | 2/2009 |
| WO | 2009090442 A1 | 7/2009 |
| WO | 2012056585 A1 | 5/2012 |

OTHER PUBLICATIONS

Notice of Rejection in Japanese Patent Application No. 2015-524733, dated Jul. 11, 2017.
Office Action in Chinese Patent Application No. 201380049107.9, dated Oct. 21, 2016.

* cited by examiner

ONE-PIECE PART INCLUDING A MAGNETOCALORIC MATERIAL NOT INCLUDING AN ALLOY INCLUDING IRON AND SILICON AND A LANTHANIDE, AND HEAT GENERATOR INCLUDING SAID PART

CROSS-REFERENCE TO RELATED APPLICATIONS

This application is a National Stage of International patent application PCT/EP2013/065749, filed on Jul. 25, 2013, which claims priority to foreign French patent application No. FR 1257496, filed on Aug. 1, 2012, the disclosures of which are incorporated by reference in their entirety.

FIELD OF THE INVENTION

The field of the invention is that of thermal devices and, more specifically, magnetic cold generators.

BACKGROUND

Generally, cold production addresses a constantly changing need and, these days, represents a significant proportion of world electricity consumption used notably for conditioned air and the conservation of foodstuffs, and this despite the fact that the efficiency of the conventional refrigeration techniques based on gas compression and expansion remain inadequate.

The first refrigerants such as ammonia, sulfer dioxide, carbon dioxide or methyl chloride were very poisonous to people and the environment. They were replaced by chlorofluorocarbons, which were themselves prohibited in the early years of the new millenium because of their contribution to the greenhouse effect and the damage to the ozone layer. This problem remains since the hydrochlorofluorocarbons that are currently used continue, in lesser proportions, to have the same damaging effects as the earlier refrigerants.

In this context, there is therefore a two-fold advantage, energy-wise and environment-wise, in developing new cold production techniques that make it possible, on the one hand, to eliminate the refrigerant gases and, on the other hand, improve energy efficiency. Alternative techniques that can notably be cited include: thermoacoustic refrigeration, thermoelectric refrigeration or even magnetic refrigeration.

The latter relies on the magnetocaloric effect (EMC) of certain materials, which consists of a variation of their temperature when they are subjected to a magnetic field. It is thus sufficient to subject these materials to a succession of magnetization and demagnetization cycles and to perform a heat exchange with a heat-transfer fluid to obtain the widest possible temperature variation. The efficiency of such a magnetic refrigeration cycle exceeds that of a conventional refrigeration cycle by approximately 30%.

This energy saving that can be achieved with magnetic refrigeration makes it particularly interesting for domestic or industrial air conditioning or refrigeration applications.

The magnetocaloric effect (EMC) is at its maximum when the temperature of the material is close to its Curie temperature, the Curie temperature (Tc) being the temperature at which the material loses its spontaneous magnetization. Above this temperature, the material is in a disordered state called paramagnetic state.

Some magnetic materials such as gadolinium, arsenic or certain alloys of MnFe type exhibit magnetocaloric properties that are particularly well suited to the abovementioned applications.

Among these alloys, and notably based on Si, it is known practice, depending on the Curie temperatures sought, to be able to use alloys based on LaFeSiCo or based on LaFeSi (H). The insertion of light atoms such as hydrogen or cobalt into the LaFeSi compounds can be an effective way of increasing the Curie temperature while keeping the EMC effect of the material high. Such materials are particularly interesting because of their magnetocaloric properties combined with production costs, allowing for mass market applications, that are more favorable than those of materials such as gadolinium.

Generally, to exploit the properties of such magnetocaloric materials, the magnetic cold technology relies on the interaction of these materials with a heat transfer liquid that can be water-based.

The material heats up almost instantaneously when it is placed in a magnetic field and cools down by a similar thermal dynamic when it is removed from the magnetic field.

During these magnetic phases, the material is passed through by the liquid, called heat-transfer liquid, which will either be heated up on contact with the material during a so-called magnetization phase, or be cooled down on contact with the material during a so-called demagnetization phase.

Conventionally, the heat transfer fluid circulates in rectilinear channels or emergent pores that exist in the magnetocaloric material, this circulation corresponding to laminar mode hydraulic flow of the fluid, so as to obtain a maximum exchange surface area, with a minimum hydraulic head loss.

Thus, a cycle comprises:
a magnetization phase (magnetic state=1);
a demagnetization phase (magnetic state=0)
which is reflected in energy available in each phase.

This cycle is repeated up to frequencies of several hertz. When the frequency increases, the thermal power (for example: the cooling) delivered by the apparatus also increases.

For this power to increase in proportion to the increase in frequency, it is necessary to have heat exchange characteristics between the material and the liquid which make it possible to increase this thermal flow.

The geometry of a part made of magnetocaloric material is therefore essential to ensure an optimum heat exchange between said part and the heat transfer fluid which circulates in contact therewith.

It is known practice to use lamellar structures of magnetocaloric material that allow the circulation of fluid between said blades and thus increase the exchange surface areas with the heat transfer fluid.

It is then necessary to reproducibly, constantly and very accurately gauge the distances between said blades of material so as to best control the heat exchange processes. This necessitates the use of mutual blade positioning elements while ensuring the control of the geometrical parameters necessary for obtaining satisfactory heat exchange characteristics.

SUMMARY OF THE INVENTION

In this context, the present invention proposes an optimized part structure made of magnetocaloric material and a method that makes it possible to produce such a part, whereas the conventional techniques currently deployed do not make it possible to achieve the form ratios necessary for optimizing the heat exchanges, because of excessively small dimensions to be achieved in mass parts.

More specifically, the subject of the invention is a one-piece part, namely made of a single piece, based on at least one magnetocaloric material not comprising an alloy comprising iron and silicon and a lanthanide, characterized in that:
  said part comprises a base situated in a first plane defined by a first direction Dx and by a second direction Dy at right angles to the first direction Dx and a set of N unitary blades $L_{a,i}$ secured to said base;
  said blades having a first dimension $D_{Lai,x}$ in the first direction, a second dimension $D_{Lai,y}$ in the second direction and a third dimension $D_{Lai,z}$ in a third direction Dz at right angles to the first and second dimensions;
  an ith blade being substantially parallel to and separated from an (i+1)th blade by an ith distance $d_i$;
  the ratio between the second dimension $D_{Lai,y}$ and the first dimension $D_{Lai,x}$ being greater than or equal to 10;
  the ratio between the third dimension $D_{Lai,z}$ and the first dimension $D_{Lai,x}$ being greater than or equal to 6;
  the first dimension $D_{Lai,x}$ being of the same order of magnitude as said distance $d_i$ separating an ith blade from an (i+1)th blade.

Particularly suitable dimensions can lie within the following ranges:
  0.1 mm≤$D_{Lai,x}$≤0.8 mm;
  10 mm≤$D_{Lai,y}$≤100 mm;
  5 mm≤$D_{Lai,z}$≤25 mm and being able preferably to be of the order of 12 mm.

According to a variant of the invention, the distance between an ith blade and an (i+1)th blade lies between approximately 0.1 mm and 1 mm.

Advantageously, another subject of the present invention is a complex part comprising two one-piece parts according to the invention, said two parts being embedded head-to-tail, making it possible to reduce the free space between blades.

According to a variant of the invention, the blades comprise convex upper surfaces.

According to a variant of the invention, said base comprises hollowed-out surfaces between an ith blade and an (i+1)th blade.

Advantageously, the profile of the hollows can be of concave type, the hollows having a radius of curvature optimized in such a way as to reinforce the velocity of a heat transfer fluid intended to circulate between the blades. Typically the radius of curvature can be of the order of 0.1 mm.

Typically, the number of blades of the one-piece part can be between ten or so and thirty or so blades.

It should be noted that it may be advantageous to manufacture thermal generation devices comprising magnetocaloric elements operating at different Curie temperatures and therefore parts made of different magnetocaloric materials, these parts having to be easily recognizable through the presence of marking elements.

This is why, according to a variant of the invention, the set of blades comprises at least one blade of third dimension different from that of the other blades making it possible to constitute a marking of said one-piece part. The positioning of the blade $L_{a,i}$ concerned in the set of the blades $L_{a,1}, \ldots, L_{a,N}$ being relative to a given Curie temperature.

Similarly, a distinctive sign can also be incorporated on the base, more particularly in this case, said base comprises at least one surface between an ith blade and an (i+1)th blade, hollowed out differently from the other hollowed out surfaces, making it possible to constitute a marking of said one-piece part.

Advantageously, in a configuration with two blocks fitted head-to-tail, a blade of third dimension greater than that of the other blades of the block will be fitted in a base hollowing of conformal dimensions, which will allow for a relative positioning of the two blocks guaranteeing fluid blade thicknesses that are even and that conform to the specifications. These noteworthy dimensions can therefore fulfill a marking and positioning function or just one of these functions.

So as to optimize the fluid flow configurations through the one-piece part, the ratio between the dimension in the third direction of the base $D_{E,z}$ and the dimension in the second direction of the base $D_{E,y}$ lies between approximately ⅕ and ¹⁄₃₀;
  the ratio between the dimension in the third direction of the base $D_{E,z}$ and the third dimension $D_{Lai,z}$ is of the order of ½₀;
  the first dimension $D_{Lai,x}$ being preferentially substantially equal to the dimension in the third direction of the base $D_{E,z}$.

According to a variant of the invention, the base being made of a base material, the blades are made of at least one magnetocaloric material, the base material and the magnetocaloric material being different. Typically, the base can be produced in a non-magnetocaloric material that is less expensive than a magnetocaloric material.

According to a variant of the invention, the one-piece part comprises at least two series of blades made of at least two different magnetocaloric materials. Thus, by mixing, for example, different magnetocaloric materials and therefore Curie temperatures, it is possible to finely tune a part and its thermal characteristics to a specific set of specifications.

According to a variant of the invention, the one-piece part comprises at least one magnetocaloric material chosen from: gadolinium, an alloy from the MnFe family, an alloy of MnFeSn and an alloy from the GdTb family.

According to a variant of the invention, the magnetocaloric material is a composite material comprising at least one powder of a first magnetocaloric material and an organic binder.

Another subject of the invention is a thermal module containing at least one magnetocaloric element comprising openings intended to be passed through by a heat transfer fluid, characterized in that said magnetocaloric element comprises at least one one-piece part or one complex part according to the invention.

According to a variant of the invention, the module comprises an annular arrangement equipped with housings, said housings being filled with one-piece parts.

According to a variant of the invention, the arrangement comprises channels for the passage of a fluid.

According to a variant of the invention, the thermal module comprises a flat disk structure having branches distributed radially, said branches comprising said housings and V-shaped ends. For such a configuration, and advantageously, the one-piece part has a V-shaped geometry, the set of the blades on their base being at least partially folded in the second direction Dy.

According to a variant of the invention, the branches are arranged in the form of a V, and the ends of the Vs comprise the inlets/outlets.

Another subject of the invention is a thermal generator comprising at least one thermal module of the invention, passed through by a heat transfer fluid driven in alternate displacement on either side of said magnetocaloric element, said generator comprising a magnetic arrangement set in motion to alternately subject said magnetocaloric element to a magnetic field variation and alternately create, in said magnetocaloric element, a heating and cooling cycle.

In order to produce, in all these possible variants, a one-piece part according to the present invention, the Applicant considered that an extrusion or co-extrusion method was particularly well suited to all of the constraints imposed in terms of dimensioning to obtain excellent thermal performance levels, and do so in correlation with mass industrial development constraints.

This is why the present invention can be implemented by a one-piece part production method comprising the following steps:

the continuous introduction, into at least one extruder body (Ex) comprising at least one heating sheath (Fi), of at least one powder of magnetocaloric material or a mixture of at least one magnetocaloric material with an organic binder;

the mixing, the homogenization and the melting of said powder of magnetocaloric material and, if appropriate, of the binder, by at least one extrusion screw (Vi) situated in the extruder body or bodies;

the shaping of said mixture comprising said magnetocaloric material through at least one extrusion die (fil), equipped with at least one imprint, making it possible to shape a one-piece part according to the invention;

said at least one die defining the structure of said one-piece part.

According to a variant, the method making it possible to implement the invention further comprises a step of gradual cooling in the space, at the output of said at least one die, using dedicated means.

According to a variant, the dedicated means comprise a die comprising at least one section equipped with at least one channel in which a cooling/tempering fluid can circulate.

According to a variant, the die comprises a plurality of sections each comprising an imprint, at least two sections being separated by a thermal insulation plate whose thickness is determined to allow a temperature difference between the two sections.

According to a variant, the extruding body or bodies each comprise two co-rotating screws.

According to a variant, the method making it possible to implement the invention comprises:

the continuous production of a set consisting of strips of magnetocaloric material, secured to a base;

an operation of cutting said set so as to define individual one-piece parts.

According to a variant, the method making it possible to implement the invention comprises the introduction of different materials through different feed means distributed along the extruder body or bodies.

According to a variant, the method making it possible to implement the invention comprises the introduction through a feed means of an organic binder so as to produce a composite material comprising at least one powder of magnetocaloric material.

According to a variant, said one-piece part being made up spatially of different materials in the second direction Dy, the method making it possible to implement the invention comprises the sequenced introduction of the different magnetocaloric materials so as to produce a set of continuous strips exhibiting sequences of different magnetocaloric materials, secured to a base, and the cutting of unitary one-piece parts from said set of strips.

BRIEF DESCRIPTION OF THE DRAWINGS

The invention will be better understood and other advantages will become apparent on reading the following description given as a nonlimiting example, and through the attached figures in which.

DETAILED DESCRIPTION

Generally, the one-piece part of the present invention comprises a structure incorporated in magnetocaloric material(s) in which holed regions are provided in a gauged manner and exhibiting geometrical parameters optimized for the passage of a heat transfer fluid.

Figure 1:
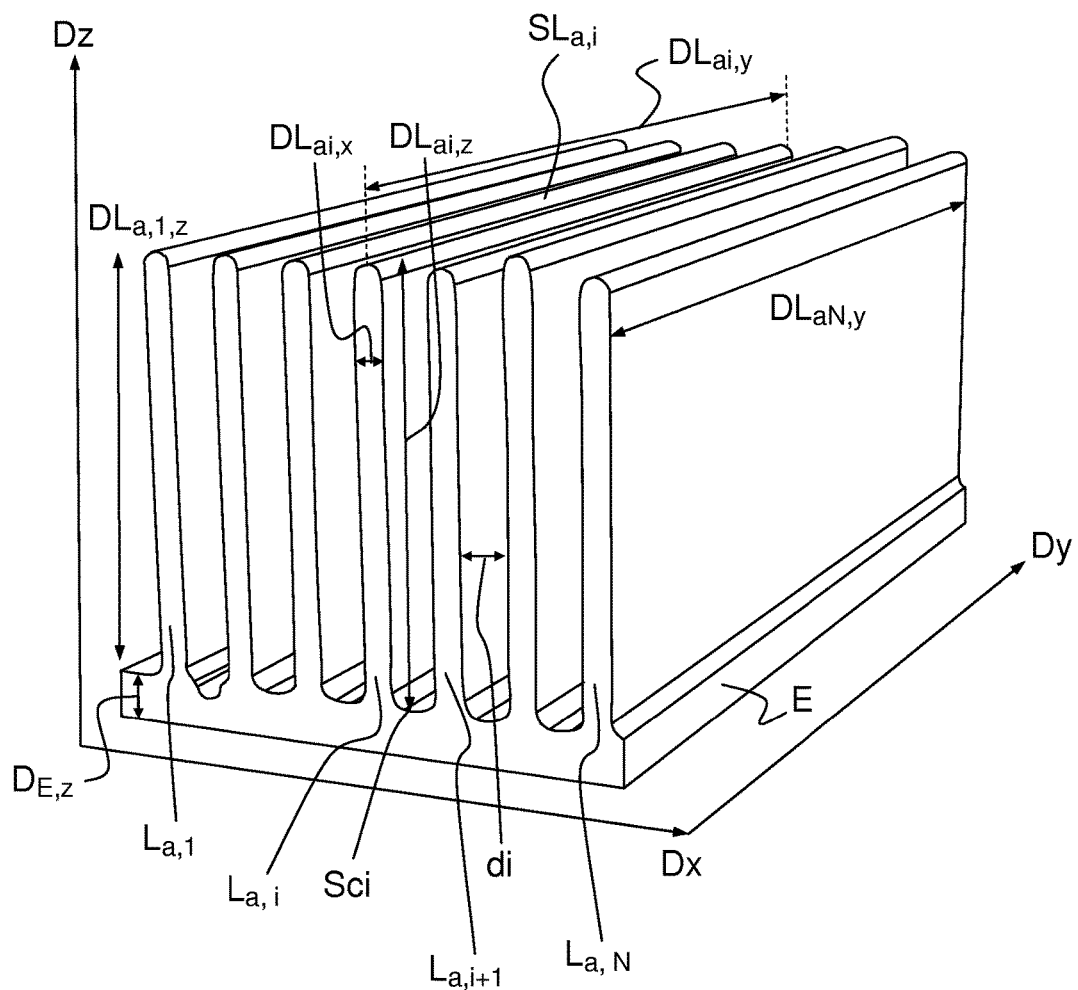
FIG. 1 illustrates a first example of a first variant one-piece part according to the invention comprising a comb-shaped structure.

According to a variant of the invention, the one-piece part can comprise a comb-shaped structure. A first example of this particularly advantageous variant is illustrated in FIG. 1.

More specifically, the one-piece part comprises, in this configuration, a comb-shaped structure with a base E and a set of blades $L_{a,1}, \ldots, L_{a,i}, \ldots, L_{a,N}$ secured to said base.

The dimensions of these blades are, according to the directions represented Dx, Dy and Dz respectively: $D_{Lai,x}$, $D_{Lai,y}$ and $D_{Lai,z}$.

Two blades $L_{a,i}$ and $L_{a,i+1}$ are, moreover, spaced apart by a distance $d_i$ intended to correspond to a fluid blade circulating between said blades, except in a case of assembly where the distance will not be the same (two fluid blades and one material blade).

The one-piece part can be made of a single magnetocaloric material. It can be a powder-based material with a composition and metallurgical structure that remain compatible with the methods implemented described below. It can also be a composite material comprising an organic binder, for example made of polymer that can be polypropylene and in which is dispersed a powder of magnetocaloric material. Typically, the powder charge ratio by volume can be of the order of 50% to 90%.

For the targeted magnetic cold technology applications, in which the aim is to optimize the interaction between a heat transfer fluid that can be water-based and the part made of magnetocaloric material subjected to magnetic alternations, the aim is to control and optimize the following main characteristics involved in the heat exchange processes.

The main determining characteristics are listed according to the following criteria:
- criterion 1: the heat exchange coefficient: h (W/m²·K);
- criterion 2: the thickness of the blade of heat transfer liquid;
- criterion 3: the height of the blade of heat transfer liquid;
- criterion 4: the thickness of the blade of magnetocaloric material(s);
- criterion 5: the height of the blade of magnetocaloric material(s);
- criterion 6: the length of the blade of magnetocaloric material(s);
- criterion 7: the number of blades of magnetocaloric material(s).

The criteria 2 to 7 thus define the geometry of the block of magnetocaloric material. These criteria combined with criterion 1 make it possible to define the heat exchange capacity of the block of magnetocaloric material.

This is reflected in a magnetocaloric material block geometry including thin grooves in which the heat transfer liquid circulates. These thin blades of material thus delimit, between them, blades of liquid.

If the blades of material are too thick, the liquid will not be able to extract the energy originating from the magnetocaloric effect of the blade sufficiently rapidly before the next cycle (the thermal conductivity of the material limits the heat transfer flux).

If the blade of water is not high enough, the exchange surface area existing on the two faces of the blades of magnetocaloric material will not be sufficient to extract sufficient power as a function of the coefficient h.

The heat exchange coefficient h is greatly dependent on the thickness of the blade of water. It increases when the thickness of the blade of water decreases.

This is why, typically, the dimensions of the blades and of the spaces between blades can advantageously be as follows:
- 0.1 mm ≤ $D_{Lai,x}$ ≤ 0.8 mm;
- 10 mm ≤ $D_{Lai,y}$ ≤ 100 mm;
- 5 mm ≤ $D_{Lai,z}$ ≤ 25 mm and preferably $D_{Lai,z}$ can be of the order of 12 mm;
- 0.1 ≤ $d_i$ ≤ 1 mm and preferably $d_i$: can be of the order of 0.2 mm.

According to the example illustrated in FIG. 1, the one-piece part further comprises specific surfaces between the blades so as to optimize the speed of circulation of heat transfer fluid between said blades and limit the appearance of turbulences in the heat transfer fluid. For this, concave surfaces $S_{ci}$ situated between two adjacent blades $D_{Lai}$, $D_{Lai+1}$ at the level of the base E with suitable radii of curvature can be provided. The upper surfaces of the blades can also be convex surfaces $S_{Lai}$.

Out of all the blades secured to the base, it may be advantageous to produce a differentiating element that makes it possible, during mass production, to recognize, for example, one one-piece part from another, in terms of thermal properties in conjunction with the material or materials of which they are made. For this, a base surface can be provided between two consecutive blades that is more concave than the others or a blade height greater than that of the other blades can be provided. The concave surface between the blades $L_{a,1}$ and $L_{a,2}$ is more hollowed out.

Figure 2:
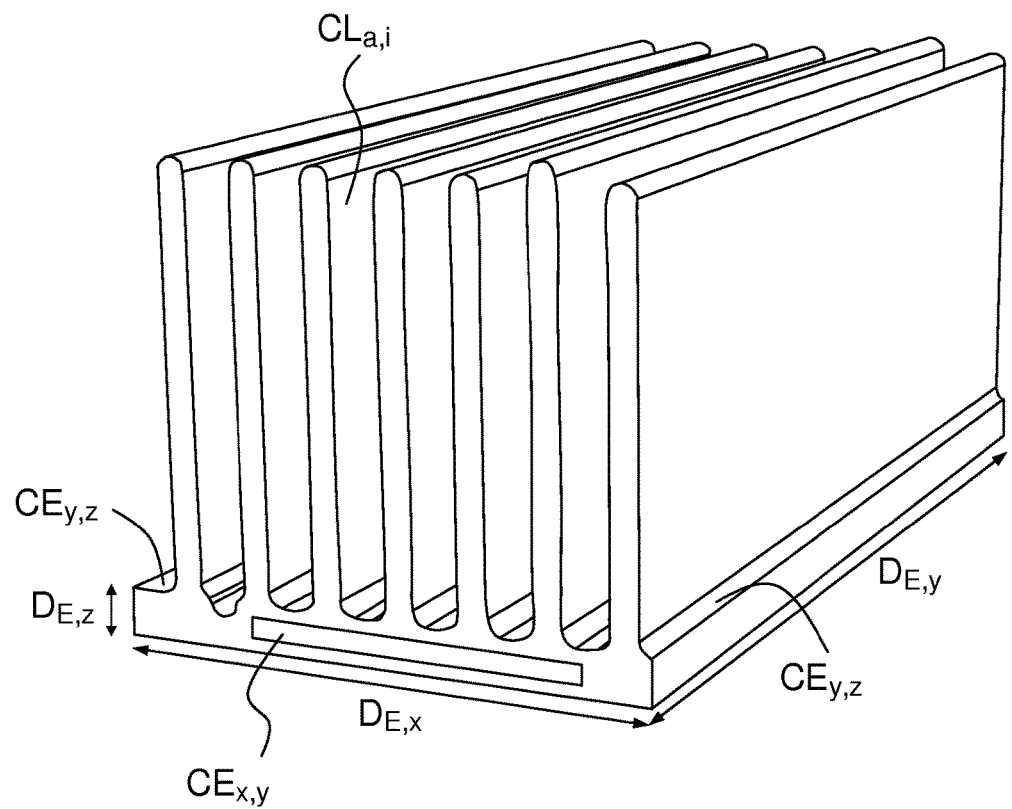
FIG. 2 illustrates a second example of the first variant one-piece part according to the invention.

According to a second example of this variant of the invention, illustrated in FIG. 2, the one-piece part also comprises a so-called base channel $C_{Ex,y}$ produced in the base so as to increase the heat exchange surface area with a heat exchange fluid. It should be noted that the offsetting or setting back of the end blades, i.e. the blades $L_{a,1}$ and $L_{a,N}$, relative to the edge of the base will also make it possible to form lateral channels $C_{Ey,z}$ and do so complementing the channels defined between the blades $CL_{a,i}$ when the part will be positioned in a housing provided for this purpose in a cold generator thermal module.

Figure 3:
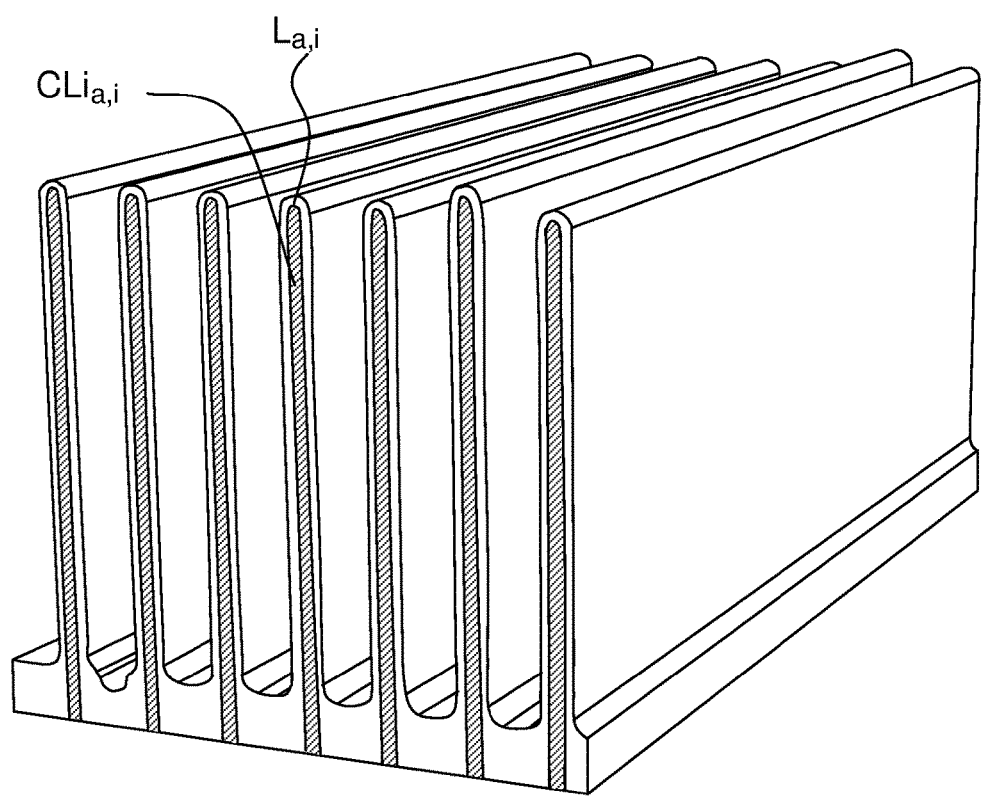
FIG. 3 illustrates a third example of the first variant one-piece part according to the invention.

According to a third example of this variant of the invention, illustrated in FIG. 3, the blades of magnetocaloric materials can comprise integrated channels $CLi_{a,i}$ in said blades $L_{a,i}$ emerging or not emerging at the base level, the representation in FIG. 3 relating to a configuration with emerging channels.

According to a fourth example which is not illustrated of this variant of the invention, said integrated channels $CLi_{a,i}$ in said blades $L_{a,i}$ can comprise a magnetocaloric or non-magnetocaloric material exhibiting a magnetic permeability greater than that of the material forming said blades $L_{a,i}$, integration of such a material makes it possible to increase the intensity of the magnetic induction when the one-piece part is subjected to a magnetic field.

Figure 4:
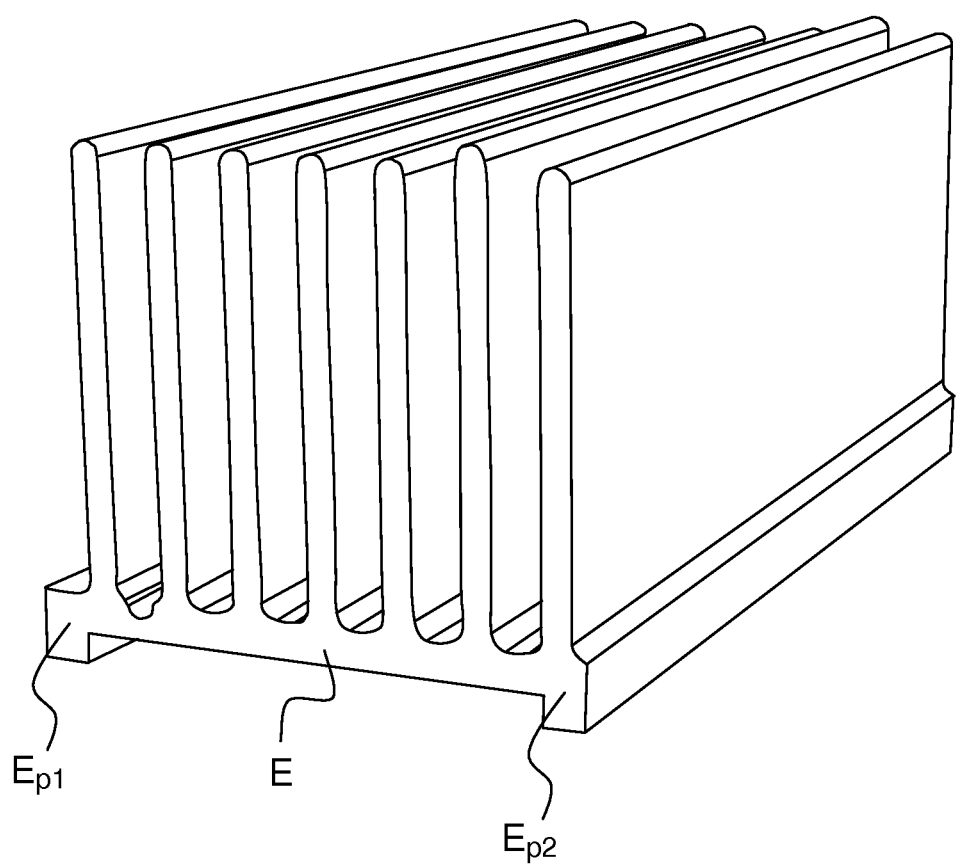
FIG. 4 illustrates a fifth example of the first variant one-piece part according to the invention.

According to a fifth example of this variant of the invention, illustrated in FIG. 4, one or more indentations can also be provided at the base level, the base E comprising peripheral parts $E_{p1}$ and $E_{p2}$. The presence of these peripheral parts $E_{p1}$ and $E_{p2}$ also makes it possible to be able to form complementary channels for the heat transfer fluid when the part is positioned in a housing provided for this purpose in a cold generator thermal module.

According to another variant of the invention that is not illustrated, the one-piece part can also comprise a solid magnetocaloric material comprising holed regions intended for the flow of a heat transfer fluid, said regions being holed in a second direction Dy, at right angles to a first direction Dx and to a third dimension Dz.

The dimensions of these holed regions in the direction Dx, and $dR_{ai,z}$ in the direction Dz are of an order of magnitude less than the dimension $dR_{ai,y}$ in the second dimension.

The distances between holed regions can typically be of the order of a few tens of millimeters.

In this type of configuration, the holed regions can be organized in a structure of honeycomb type with hexagonal holed regions.

Figure 5:
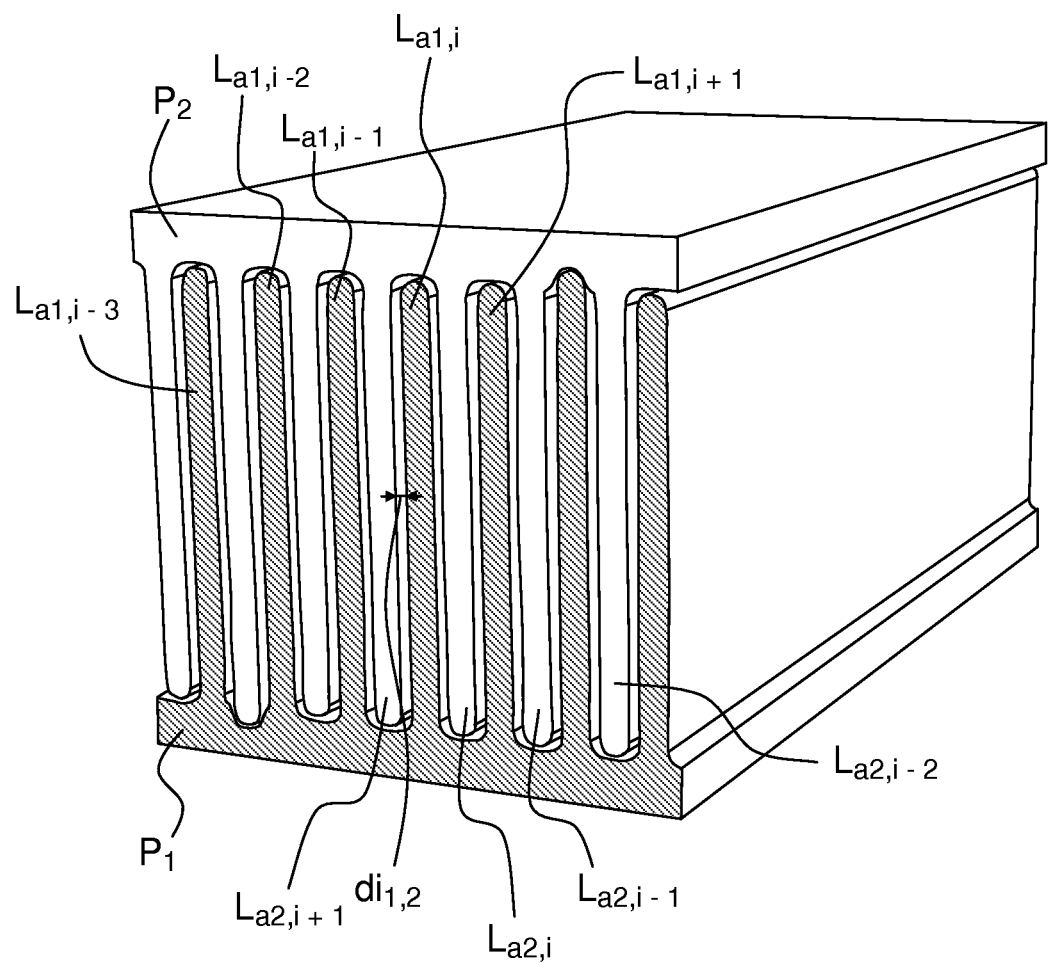
FIG. 5 illustrates an example of the assembly of two one-piece parts of the invention.

Advantageously, thermal modules using one-piece parts incorporated in thermal generators can incorporate complex parts in which two one-piece parts of the invention, $P_1$ and $P_2$, are embedded head-to-tail as illustrated in FIG. 5. This configuration makes it possible to reduce even further the thickness of the blades of fluid defined by the distance $di_{1,2}$ represented in FIG. 4, and does so between the blades $L_{a1,i}$ and $L_{a2,i}$ or $L_{a2,i}$ and $L_{a1,i+1}$. It is thus typically possible to achieve fluid blade thicknesses $di_{1,2}$ even less than 0.1 mm, whereas this is currently not possible with the known techniques.

In this case, it is advantageous to provide at least one positioning element, which can also be an element for marking blades made of materials of different characteristics from a first block, said positioning element consisting of at least one blade of third dimension greater than that/those of the other blades positioned facing a surface of the second block hollowed out in the base, said hollowing out being dimensioned to complement the end of the at least one blade of said first block. A configuration of this type is illustrated in the figure by the second blade starting from the right and the second hollow starting from the left of the bottom block of FIG. 5.

Figure 6A:
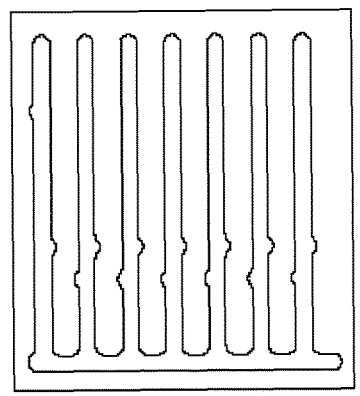
FIGS. 6a, 6b and 6c illustrate a one-piece part comprising blades structured to maintain a determined space between said blades by virtue of the presence of protruberances, and an assembly comprising such parts.
Figure 6B:
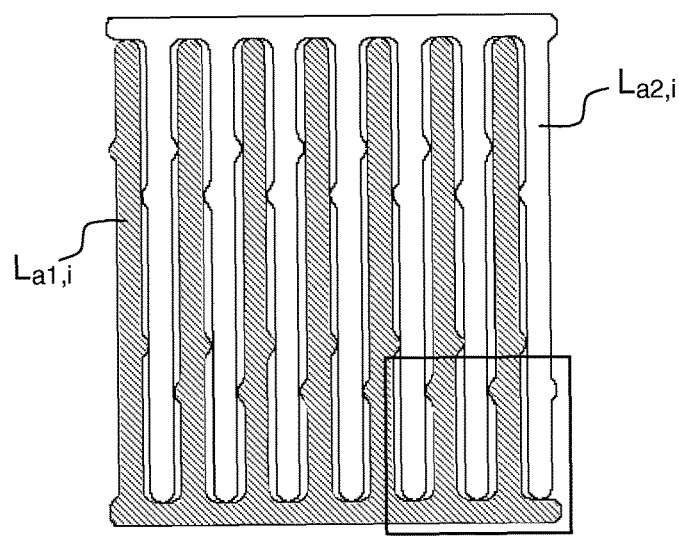
Figure 6C:
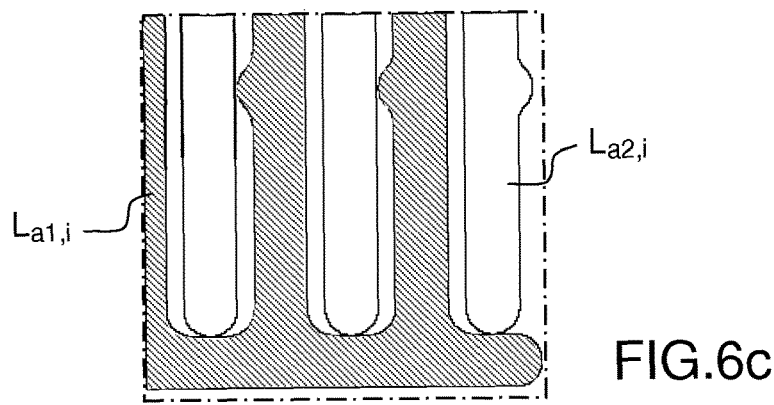

According to a variant of the invention, illustrated in FIGS. 6a, 6b and 6c, the one-piece part can advantageously comprise blades having protruberances that make it possible to impose a relatively constant spacing between the blades and do so in operation when a fluid is flowing between said blades La,i, which also makes it possible to reinforce the mechanical strength thereof. In the complex structure, the presence of these protruberances also makes it possible to reinforce the mechanical strength thereof.

Figure 7A:
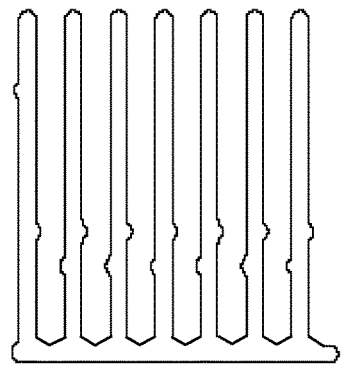
FIGS. 7a, 7b and 7c illustrate a one-piece part comprising blades structured to maintain a determined space between said blades by virtue of the presence of protruberances and a base structured to allow an adjustment of one-piece parts incorporated in an assembly.
Figure 7B:
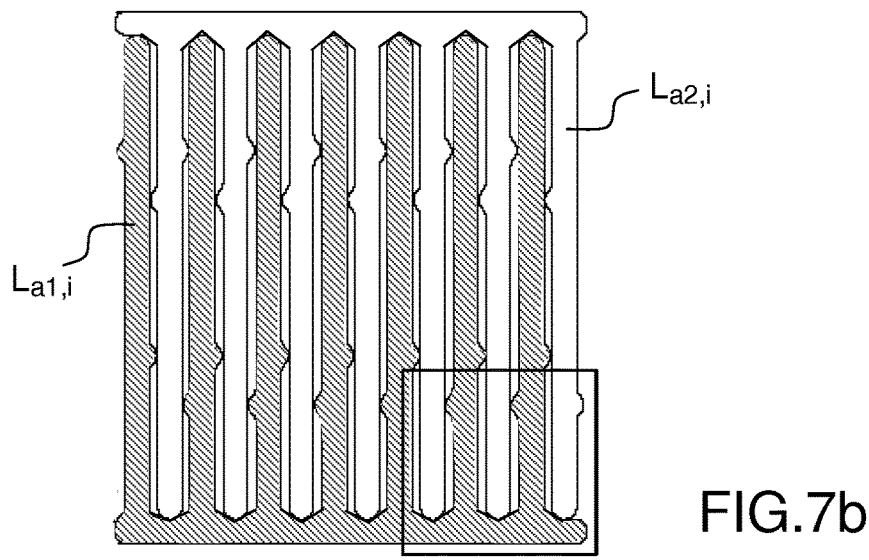
Figure 7C:
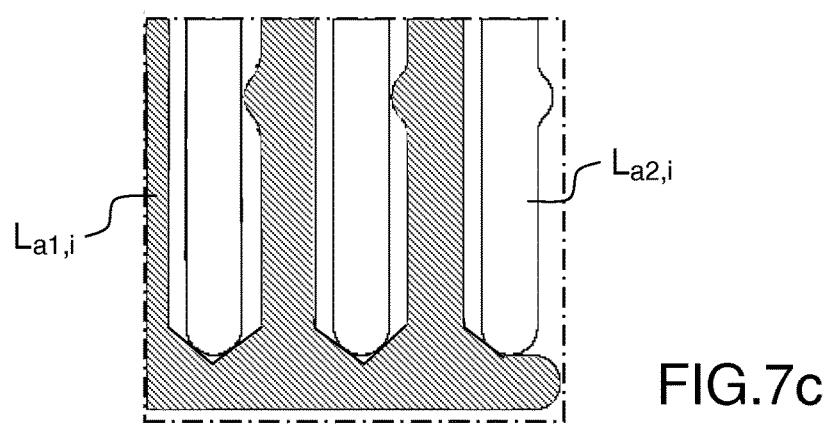

According to another variant of the invention, illustrated in FIGS. 7a, 7b and 7c, a one-piece part comprising blades with protruberances can also be embedded in a one-piece part which, for its part, has hollowed-out patterns at the base level, allowing the ends of the blades La,i of the complementary part to come to bear, in order to ensure an enhanced mechanical strength in operation.

To implement the present invention, it is proposed to use an extrusion method to produce the geometry of the one-piece part, this method making it possible to achieve the dimensions required with an excellent reproducibility and a particularly advantageous production cost.

In effect, producing parts having very small dimensions between the blades of magnetocaloric material corresponding to very thin blades of fluid currently entails firstly producing a solid block of magnetocaloric material and then secondly machining this block. The block can be produced by powder sintering at approximately 1200° C.; producing the channels by spark erosion can be tried, but the sintering generates mechanical stresses and tensions in the blocks. This can lead to the breaking of the blocks or of the blades already produced. Moreover, the spark erosion wire diameter making it possible to achieve dimensions smaller than a few tens of millimeters becomes a real problem, because the wire has to have a very small diameter, which makes it very fragile.

Generally, extrusion is a method for continuously transforming a malleable material homogenized and melted by stirring and heating (mechanical and thermal). In a sheath (cylinder), the material compressed and stirred by one or more screws is pushed toward a die, to be shaped.

More specifically, the extruder comprises an extruding body equipped with at least one heating cylindrical sheath (thermoregulated) inside which one (or two) motorized screws rotate, the body of the extruder is fed through apertures in said sheath by dosing apparatuses that have hoppers supplying pellets or powder.

The extrusion screw continuously stirs, compresses, cuts, heats and transports the fluidized and homogenized material toward the die. The latter confers the desired shape on the fluidized mass by pushing the material through the die.

Figure 8:
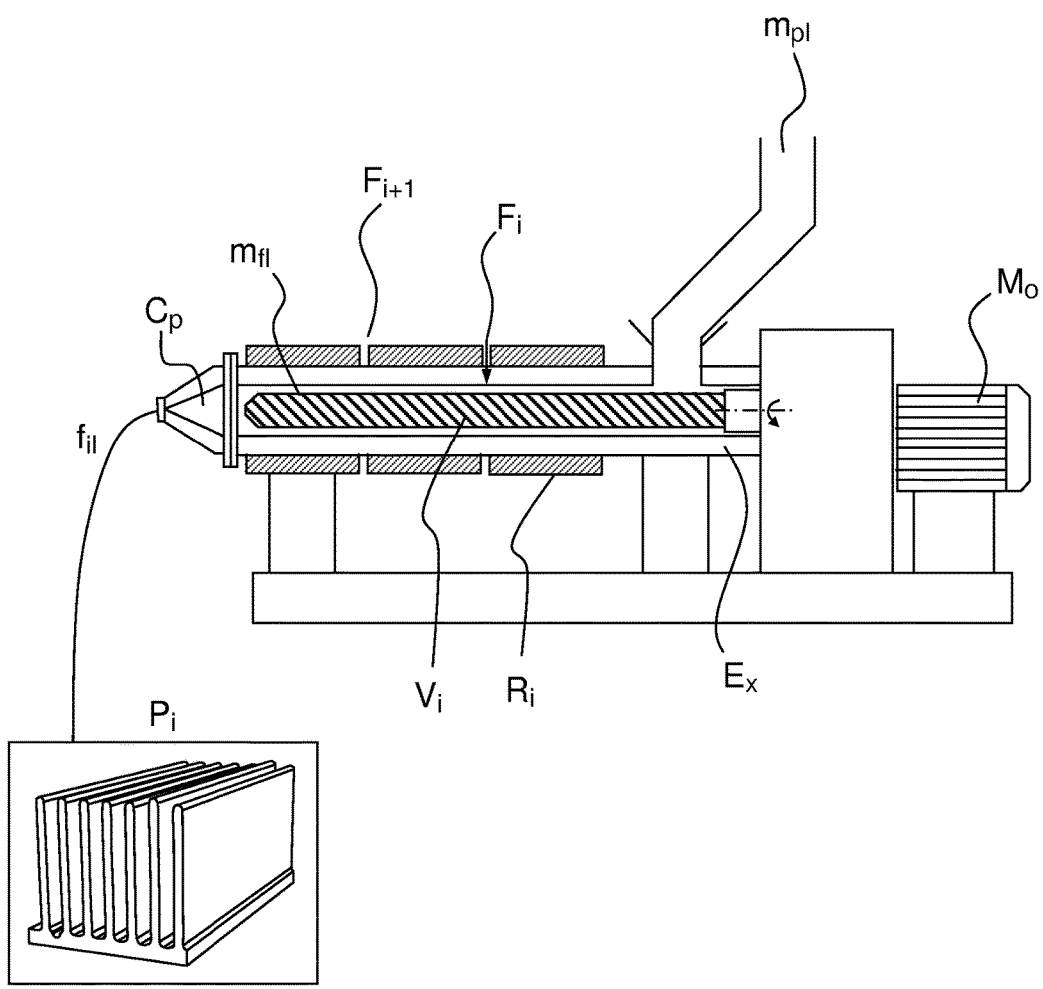
FIG. 8 schematically represents an extrusion machine making it possible to produce a one-piece part of the invention.

In the present invention, an extrusion machine can be used like the one schematically represented in FIG. 8 and notably to produce one-piece parts of composite material based on a powder of magnetocaloric material and binder, the binder being able to be made of polypropylene or of polycarbonate or of polyethylene.

Such a machine notably comprises:
an extrusion body Ex, itself comprising a set of individual sheath modules Fi, controlled by at least one heating system;
the extrusion body which advantageously comprises two co-rotating extrusion screws together referenced Vi, rotating in the same direction and thereby making it possible to achieve output pressures of the order of 150 bar. Said extrusion screws can comprise different stirring, decompression, acceleration and other such modules. Thus, the raw materials introduced into the body of the extruder are transferred from one screw module to the other which cooperate to increase the mixing capacity, the compression and the transportation of the raw materials introduced;
if necessary, a compression chamber CP which receives the fluidized and stirred material $m_{fi}$, and propels it toward one or more dies;
a die $f_{il}$ replicates the shape of the one-piece part of composite material based on magnetocaloric material powder and binder $m_{pl}$.

For example, the extrusion screw can have a length of between 1 and 4 meters, preferably 2 meters, its length can correspond to its diameter multiplied by a coefficient of between 10 and 24.

The rotation speed is between 80 and 400 rpm, the maximum pressure being able to be approximately 200 bar, bearing in mind that it is possible to provide a gate valve opening and discharging the material when the pressure is too great (typically greater than 200 bar).

The temperature of the material can be between 180° C. (corresponding to the temperature of the extrusion screw and of the sheath) and 240° C. For its part, the temperature of the die can be greater by a few degrees than the temperature of the material in order to reduce the adhesion of the material to the die.

The extrusion screw can comprise a number of different screw elements or modules, with different and/or inverted screw pitches, and also with stirring elements (that can be stacked on the axes of the extrusion screws).

By virtue of the method selected to implement the invention, it is possible to sequentially supply the extruder body so as to successively form sections of strips of different materials in the direction Dy.

Figure 9:
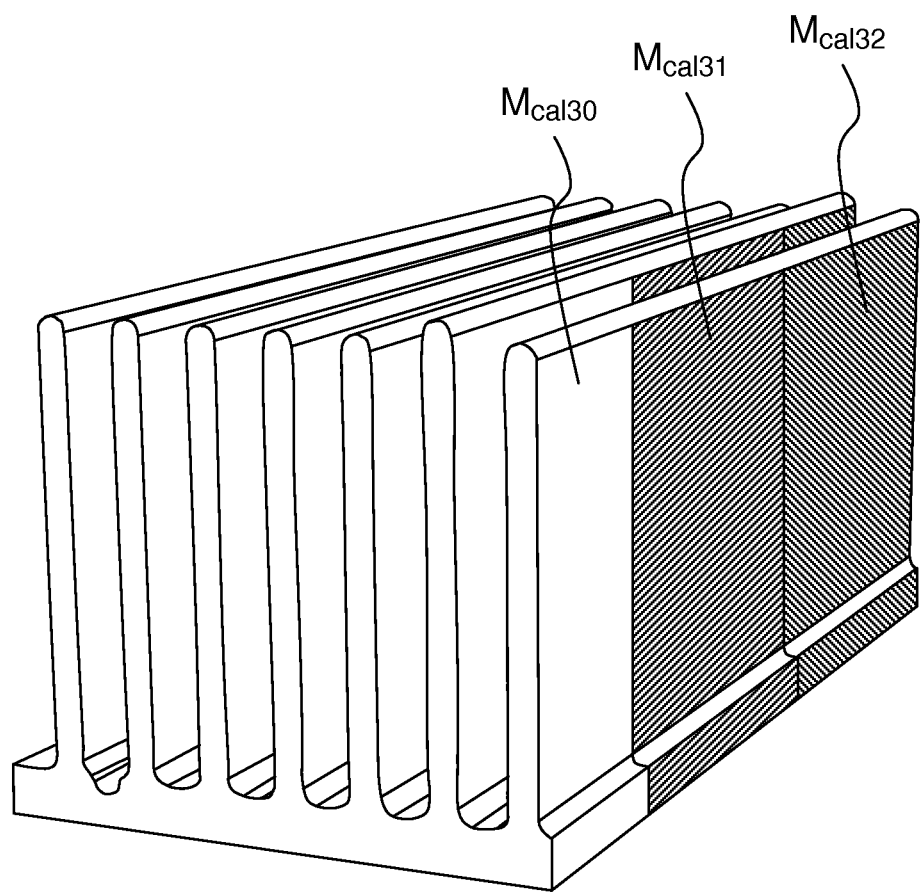
FIG. 9 illustrates an exemplary one-piece part obtained by an extrusion method with sequenced introduction of raw materials.

Thus, according to another variant of the invention illustrated in FIG. 9, the blades can comprise regions made of different magnetocaloric materials making it possible to have additional latitude in terms of overall operating temperature dependent on the Curie temperatures of the different materials. As represented, three regions respectively comprise a first magnetocaloric material $M_{cal30}$, a second magnetocaloric material $M_{cal31}$, a third magnetocaloric material $M_{cal32}$. It can be advantageous, during the mass production of one-piece parts, to supply the extruder body via different metering devices distributed along the body of the extruder and according to the following sequence and then proceed to jointly cut all the individual parts:

supply, via the metering device, powder of material $M_{cal30}$;
supply, via the metering device, powder of material $M_{cal31}$;
supply, via the metering device, powder of material $M_{cal32}$;
supply, via the metering device, powder of material $M_{cal32}$;
supply, via the metering device, powder of material $M_{cal31}$;
supply, via the metering device, powder of material $M_{cal30}$;
supply, via the metering device, powder of material $M_{cal30}$, . . . ,
and so on, so as to produce interfaces of high quality in the cutting operation, by virtue of the fact that the cutting takes place in one and the same material and not at the interface between two different materials.

It is also particularly advantageous and suitable to use a co-extrusion method to produce a one-piece part made of different materials in planes parallel to the plane defined by the directions Dx, Dy.

Figure 10:
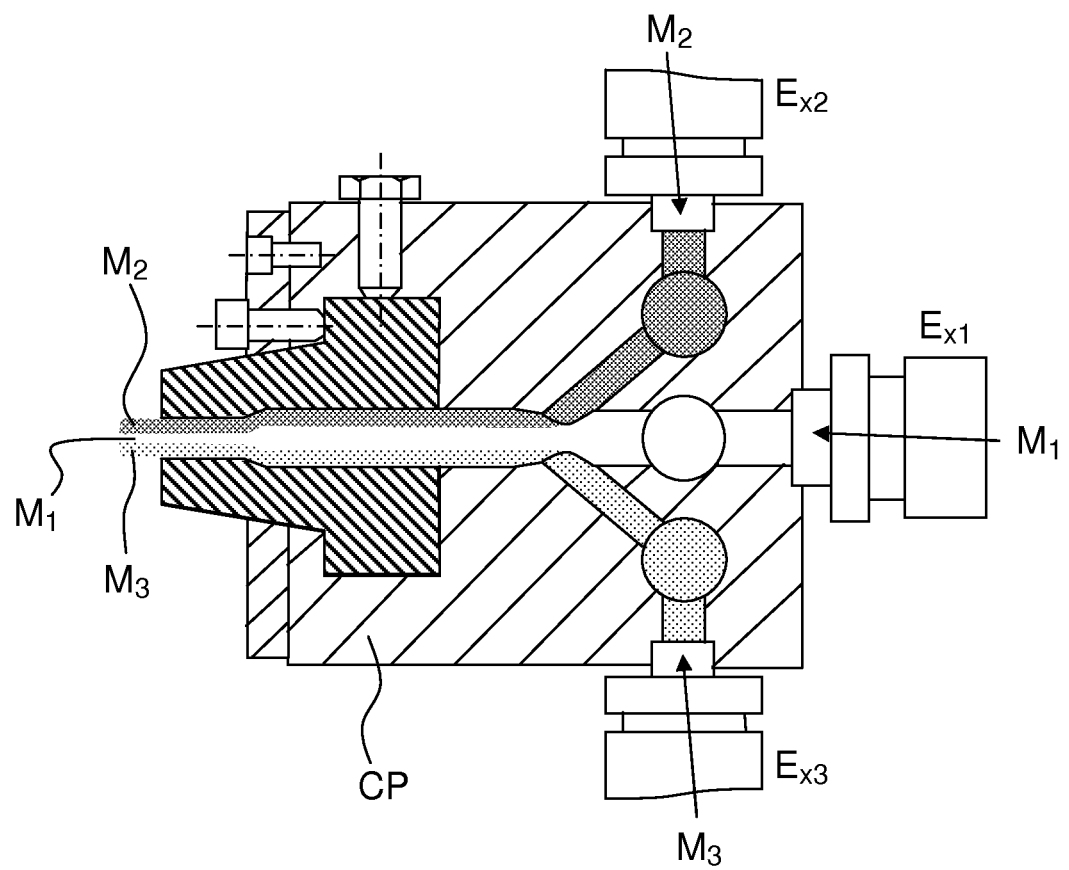
FIG. 10 illustrates the extrusion chamber at the output of a plurality of extruder bodies in the case of a co-extrusion machine.

To do this, a number of extruder bodies are used in parallel, all emerging into a single compression chamber CP as schematically represented in FIG. 10, which shows a compression chamber fed by three extruder bodies $Ex_1$, $Ex_2$ and $Ex_3$, which are themselves fed with different materials $M_1$, $M_2$, $M_3$.

Figure 11:
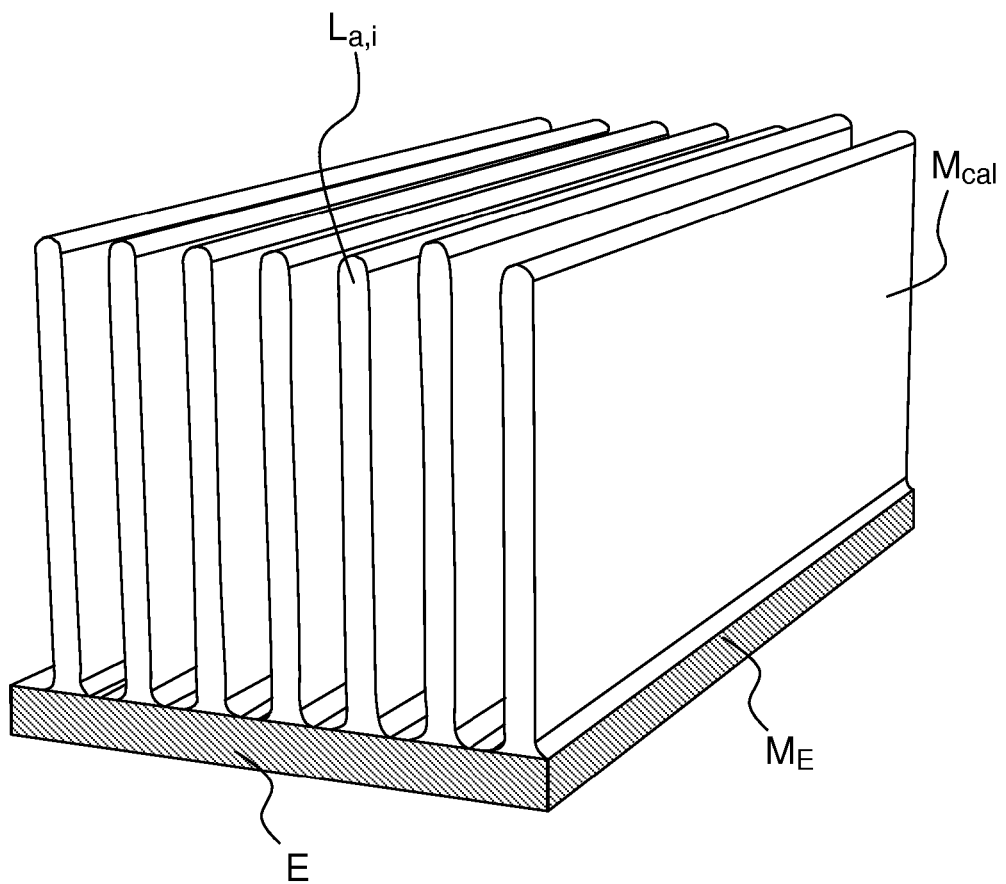
FIG. 11 illustrates a first example of a one-piece part obtained by a co-extrusion machine.

It is thus possible to notably form the one-piece part illustrated in FIG. 11 in which the base E is produced in a first material called base material $M_E$, the blades being produced in a second material $M_{cal}$, said second material being a magnetocaloric material, whereas the base material need not be.

Figure 12:
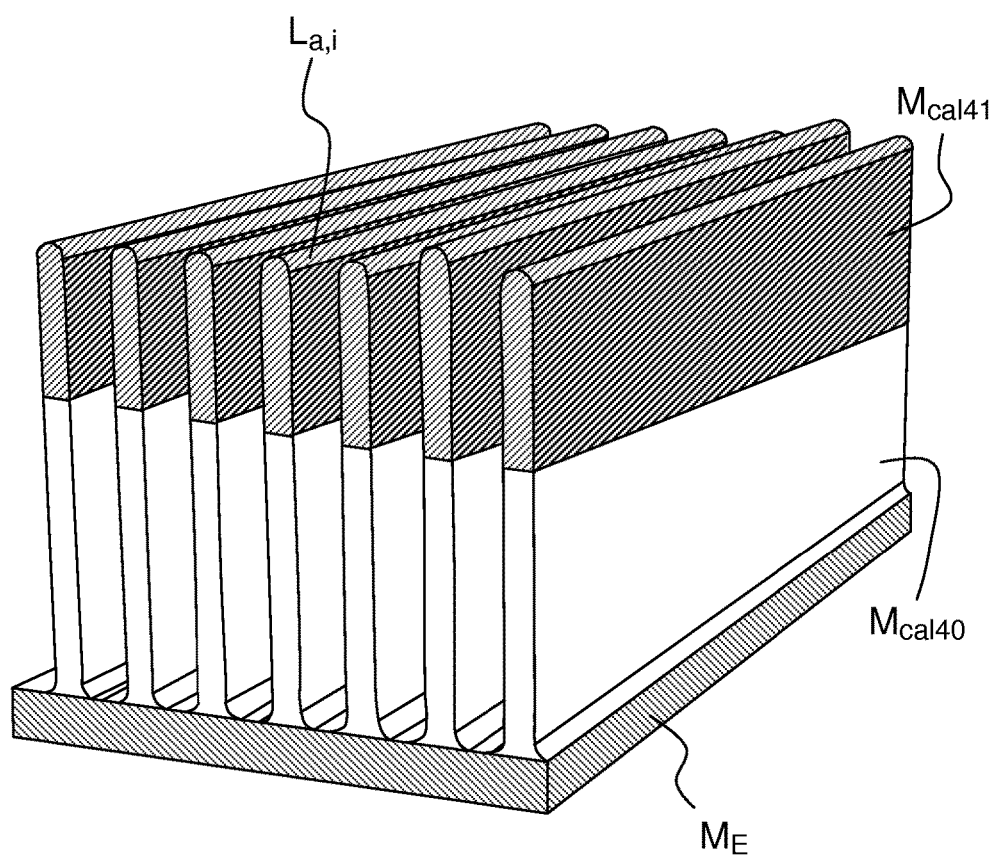
FIG. 12 illustrates a second example of a one-piece part obtained by a co-extrusion machine.

According to another variant illustrated in FIG. 12, the blades $L_{a,i}$ can be made of two different magnetocaloric materials $M_{cal40}$ and $M_{cal41}$ distributed in the direction Dz, the base being able to be or not be made from a third material, called base material $M_E$, which may or may not be magnetocaloric.

Generally, in the extrusion or co-extrusion production method, a means for cooling said one-piece part can be provided, to ensure that it keeps its shape after it is removed from said die $f_{il}$. The benefit of this cooling means is to avoid having the one-piece part become deformed when it leaves the die $f_{il}$. The aim of this cooling is to bring the one-piece part very quickly from a temperature of approximately 200° C. to a temperature close to ambient temperature. This cooling means can come in a number of variants.

A first variant which is not represented consists in using external cooling means and thus in cooling the one-piece part on leaving the die with a blade of air at low temperature (approximately 5° C. for example) and at low speed (suitable speed to avoid deforming the one-piece part).

Figure 14:
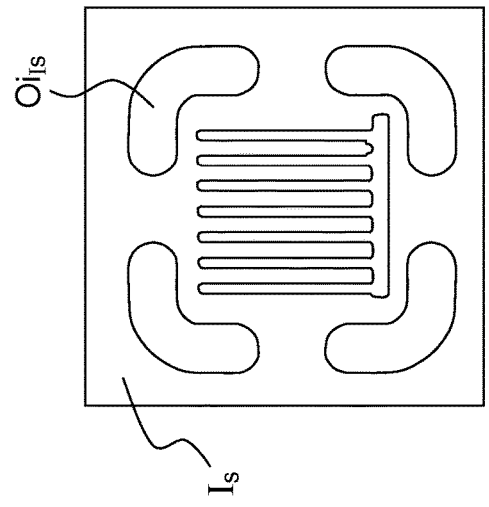
FIG. 14 illustrates a view in elevation of an insulation plate incorporated between sections of the die illustrated in FIG. 11.
Figure 13:
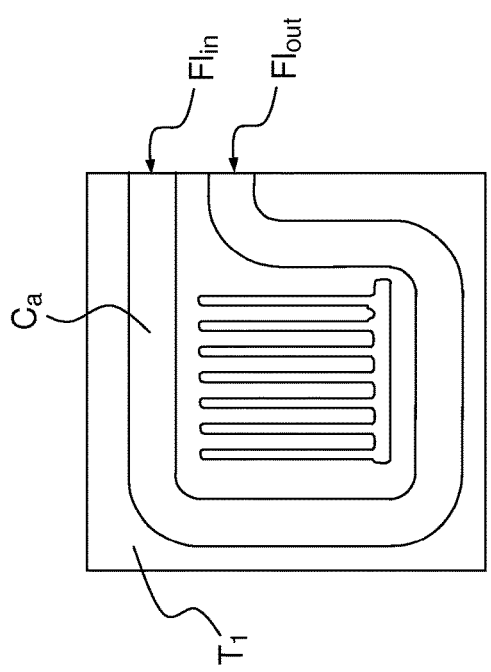
FIG. 13 illustrates a view in elevation of a die section comprising a cooling channel used in an exemplary extrusion method of the invention.
Figure 15:
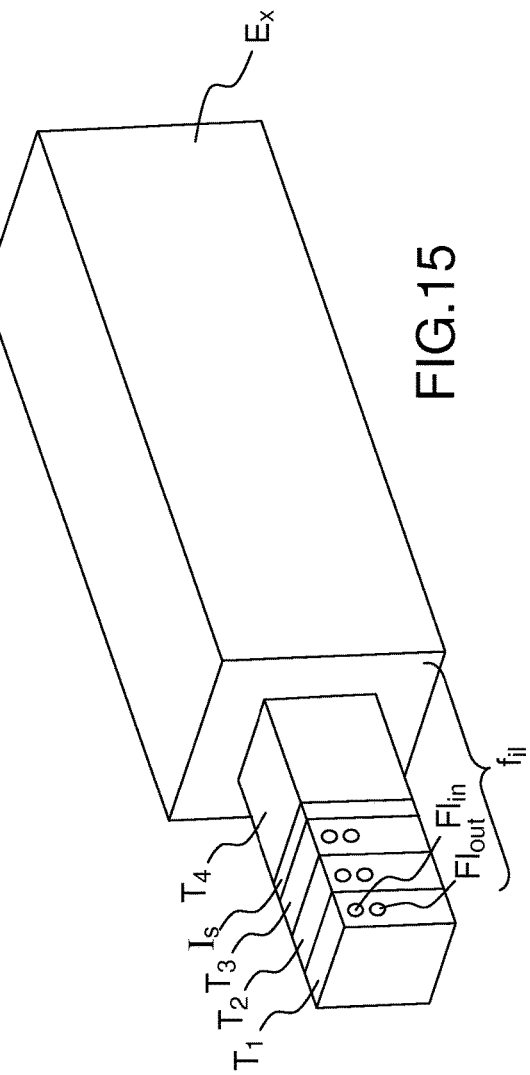
FIG. 15 illustrates a view of an extrusion machine used in a method of the invention.

A second variant represented in FIGS. 13 to 15 consists in incorporating the cooling means in the die $f_{il}$ comprising the imprint of the one-piece part. To this end, it is possible to provide a die $f_{il}$ comprising a number of sections Ti, at least the last of which (situated at the output) comprises at least one channel $C_a$ for the circulation of a coolant (liquid or gaseous), with an inlet $F_{lin}$ and an outlet $F_{lout}$. The temperature of this fluid makes it possible to cool the one-piece part even while it is being shaped in the die $f_{il}$. A thermal insulation part $I_s$ produced, for example, by a plate of synthetic or composite material such as PEEK can be fitted between at least two sections of the die $f_{il}$, this insulating plate illustrated in FIG. 14 comprises, in a variant, openings $Oi_{Is}$ and a holed form close to the imprint of the part.

FIG. 15 represents a schematic view of an extrusion machine with a die comprising four sections $T_1$, $T_2$, $T_3$ and $T_4$. The sections $T_1$, $T_2$ and $T_3$ comprise a cooling channel intended for the circulation of a coolant. The section $T_4$ produces the initial shape of the part. The three sections $T_1$, $T_2$ and $T_3$ are thermally insulated from the first section $T_4$ by an insulating plate $I_s$ having hollowed out areas or openings $Oi_{Is}$ (without material). In such a configuration, gradually cooling the one-piece part by making fluids with different temperatures circulate in the different sections $T_1$, $T_2$, $T_3$ may or may not be envisaged. The fluid circulating in the section $T_3$ can have the highest temperature and that circulating in the section $T_1$ can have the lowest temperature. It is also possible to envisage incorporating other insulating plates, notably between the sections comprising a cooling channel.

The invention is not limited to such a number of sections, it is possible for example to envisage incorporating two sections: one section comprising a cooling channel and another section without cooling channel.

According to the present invention, the one-piece parts described previously can advantageously be incorporated in a thermal module.

Figure 16:
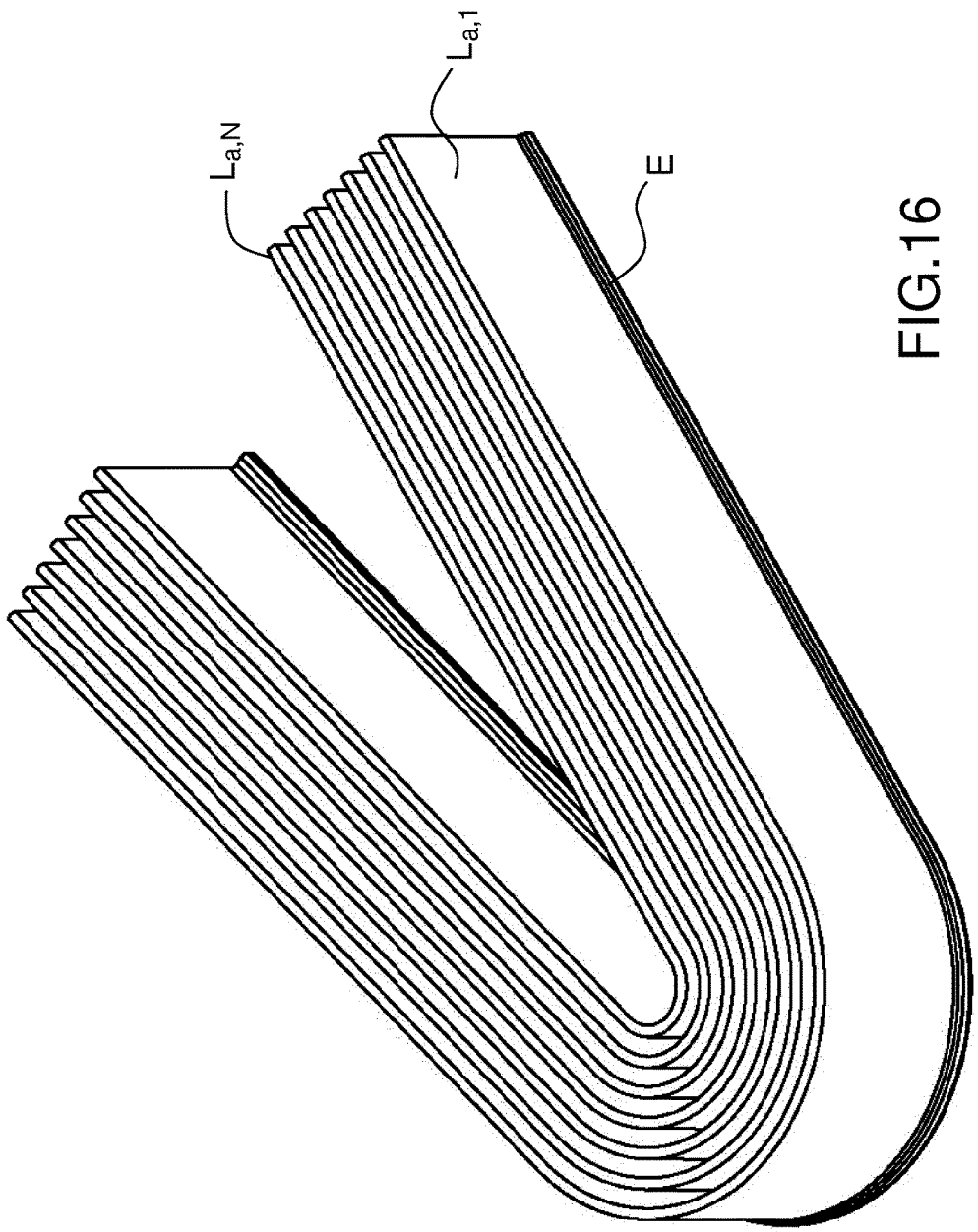
FIG. 16 illustrates a variant one-piece part in folded configuration.

For that, according to an advantageous variant, the one-piece part can have a V-shaped geometry, the set of blades on their base being curved in the second direction Dy, as illustrated in FIG. 16.

Figure 17:
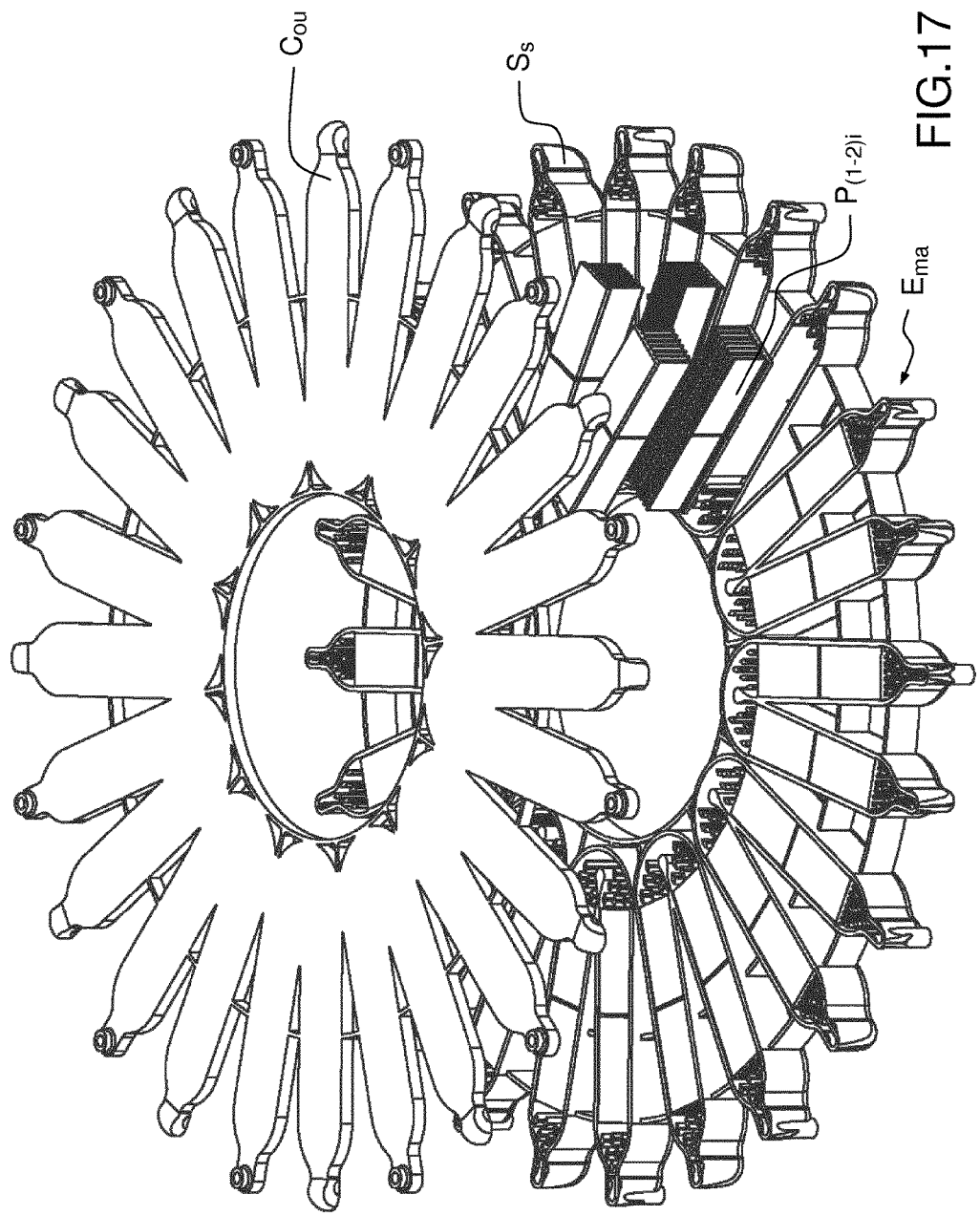
FIG. 17 illustrates an exploded view of an example of a thermal module of the invention.

FIG. 17 illustrates an exploded view of all the constituent elements of an exemplary thermal module configuration incorporating individual sets, each comprising one or more complex parts $P_{(1-2)i}$ comprising pairs of one-piece parts paired head-to-tail. Advantageously, the module can comprise a support structure $S_s$ in the form of a flat disk, covered by a lid $C_{ou}$. The V-shaped positioning of the one-piece parts in a flat disk with fluid inlets/outlets at the ends of the branches of the Vs is particularly suitable. In effect, this configuration makes it possible on the one hand to place a lot of material mass in a limited volume and, on the other hand, to simplify the heat transfer fluid circuit (not represented), the ducts being able to be connected to the free ends of the Vs.

In a variant that is not illustrated, the support structure $S_s$ is suitable for receiving complex parts comprising two one-piece parts embedded head-to-tail as represented in FIG. 5.

Figure 18:
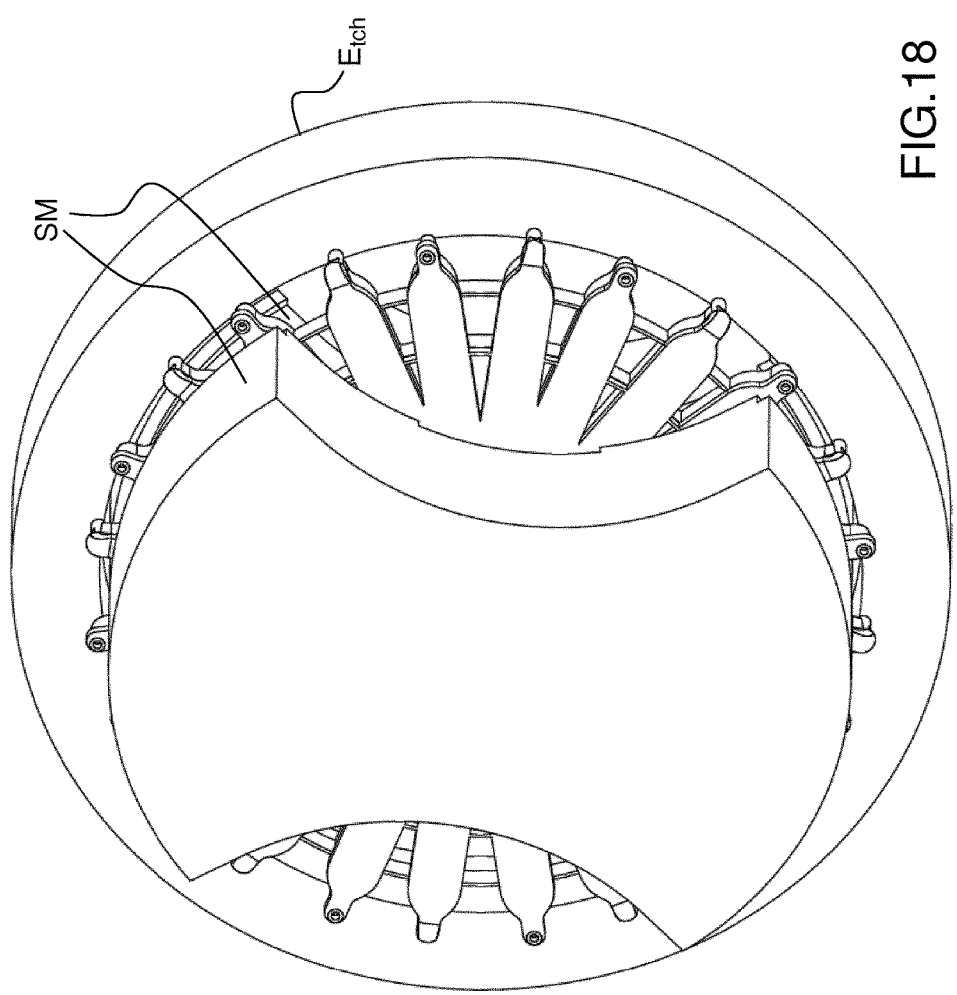
FIG. 18 illustrates a thermal generator incorporating the thermal module illustrated in FIG. 17.

FIG. 18 illustrates a thermal generator incorporating the module illustrated in FIG. 17, coupled to a magnetic system SM and to a heat exchanger $E_{tch}$.

The invention claimed is:

1. A one-piece part comprising a magnetocaloric material not comprising an alloy including iron, silicon, and a lanthanide, the one-piece part being configured to transfer heat when subjected to a magnetic field, the one-piece part comprising:
   a base (E) positioned in a first plane defined by a first direction (Dx) and a second direction (Dy); and
   a set of N unitary blades ($L_{a,i}$) secured to said base (E), wherein:
      said set of blades have a first dimension ($D_{Lai,x}$) in the first direction ($D_x$), a second dimension ($D_{Lai,y}$) in the second direction ($D_y$), and a third dimension ($D_{Lai,z}$) in a third direction (Dz) at right angles to the first and second dimensions,
      an ith blade is separated from an (i+1)th blade by an ith distance ($d_i$), a ratio between the second dimension ($D_{Lai,y}$) and the first dimension ($D_{Lai,x}$) is greater than or equal to 10, a ratio between the third dimension ($D_{Lai,z}$) and the first dimension ($D_{Lai,x}$) is greater than or equal to 6, and the first dimension is of the same order of magnitude as said ith distance ($d_i$) separating the ith blade ($L_{a,i}$) from the (i+1)th blade ($L_{a,i+1}$).

2. The one-piece part of claim 1, wherein the first dimension lies between approximately 0.1 mm and 0.8 mm.

3. The one-piece part of claim 1, wherein the second dimension lies between approximately 10 mm and 100 mm.

4. The one-piece part of claim 1, wherein the third dimension lies between approximately 6 mm and 25 mm.

5. The one-piece part of claim 1, wherein the distance (di) between the ith blade and the (i+1)th blade lies between approximately 0.1 mm and 1 mm.

6. The one-piece part of claim 1, wherein the set of blades comprise convex upper surfaces ($S_{La,i}$).

7. The one-piece part of claim 1, wherein said base comprises hollowed-out surfaces ($S_{Ci}$) between the ith blade and the (i+1)th blade.

8. The one-piece part of claim 7, wherein said base comprises concave surfaces between the ith blade and the (i+1)th blade.

9. The one-piece part of claim 1, wherein the set of blades comprises at least one blade of a third dimension different from that of other blades of the set of blades, such that the third dimension comprises a marking and/or positioning element.

10. The one-piece part of claim 1, wherein said base comprises at least one hollowed-out surface ($S_{Ci}$) that is different than second hollowed-out surfaces, such that the at least one hollowed-out surface ($S_{Ci}$) comprises at least one marking and/or positioning element.

11. The one-piece part of claim 1, wherein at least one subset of blades has at least one protruberance extending along the second direction Dy, said protruberance being situated between the base and the end of the blade opposite said base, so as to gauge the space between two adjacent blades.

12. The one-piece part of claim 1, wherein:

a ratio between the dimension in the third direction of the base ($D_{E,z}$) and the dimension in the second direction of the base ($D_{E,y}$) lies between approximately 1/5 and 1/30;

a ratio between the dimension in the third direction of the base ($D_{E,z}$) and the third dimension ($D_{Lai,z}$) is of the order of 1/20;

the first dimension ($D_{Lai,x}$) being equal to the dimension in the third direction of the base ($D_{E,z}$).

13. The one-piece part of claim 1, wherein the base is made of a base material, and the set of blades are made of at least one magnetocaloric material, the base material and the magnetocaloric material being different.

14. The one-piece part of claim 1, wherein the set of blades includes at least two series of blades made of at least two different magnetocaloric materials.

15. The one-piece part of claim 1, wherein at least one subset of the set of blades comprises regions distributed in the second direction (Dy) made of different magnetocaloric materials.

16. The one-piece part of claim 1, wherein at least one subset of the set of blades comprises regions distributed in the third direction (Dz) made of different magnetocaloric materials.

17. The one-piece part of in claim 1, wherein at least one of the set of blades has an integrated channel ($CLi_{a,i}$) emerging or not emerging at the base level.

18. The one-piece part of claim 1, wherein the base comprises at least one channel ($C_{E\ x,y}$) in said first plane configured to receive a passage of a fluid.

19. The one-piece part of claim 1, wherein the base comprises peripheral parts ($E_{p1}$,$E_{p2}$).

20. The one-piece part of claim 1, wherein the set of blades comprise a first blade ($L_{a,1}$) and an Nth blade ($L_{a,N}$), each situated at a periphery of the base, wherein the first blade or the Nth blade is offset relative to an end of said base in said first plane.

21. The one-piece part of claim 1, wherein the one-piece part has a V-shaped configuration at least partially folded along said second direction.

22. The one-piece part of claim 1, wherein the magnetocaloric material is chosen from: gadolinium, an alloy from the MnFe family, an alloy of MnFeSn, and an alloy from the GdTb family.

23. The one-piece part of claim 1, wherein the magnetocaloric material is a composite material comprising at least one powder of a first magnetocaloric material and an organic binder.

24. The one-piece part of claim 23, wherein the binder comprises polypropylene, polycarbonate, or polyethylene.

25. A complex part comprising first and second one-piece parts of claim 1, said first and second one-piece parts ($P_1$,$P_2$) being embedded head-to-tail to reduce free space between the set of blades of the first and second one-piece parts.

26. The complex part of claim 25, wherein:

the set of blades of the first one-piece part comprises at least one blade of a third dimension greater than that of other blades of the first one-piece part, and the base of the second one-piece part comprises at least one surface hollowed out to complement the at least one blade of the third dimension.

27. A thermal module comprising:

at least one magnetocaloric element comprising openings intended to be passed through by a heat-transfer fluid, wherein said magnetocaloric element comprises at least one one-piece part of claim 1.

28. The thermal module of claim 27, further comprising an annular arrangement equipped with a set of housings, said housings comprising the one-piece parts of claim 1 and including a set of channels configured to receive a passage of a heat-transfer fluid.

29. The thermal module of claim 27, further comprising a flat disk structure having a set of branches distributed radially, said branches comprising said housings and V-shaped ends that include heat-transfer fluid inlets/outlets.

30. A thermal generator comprising at least one thermal module of claim 27, said generator comprising:

a magnetic arrangement set in motion to alternately subject said at least one magnetocaloric element to a magnetic field variation and alternately create a heating and cooling cycle in the at least one magnetocaloric element, wherein the thermal generator is configured to receive a heat-transfer fluid driven in alternate displacement on either side of the at least one magnetocaloric element.

* * * * *